(12) United States Patent
Saito et al.

(10) Patent No.: US 9,467,086 B2
(45) Date of Patent: Oct. 11, 2016

(54) VEHICLE-MOUNTED MOTOR DRIVING CONTROL BOARD

(75) Inventors: Shoji Saito, Tokyo (JP); Yoshikazu Tsunoda, Tokyo (JP); Khalid Hassan Hussein, Tokyo (JP); Shintaro Araki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/399,363

(22) PCT Filed: Jul. 12, 2012

(86) PCT No.: PCT/JP2012/067833
§ 371 (c)(1),
(2), (4) Date: Nov. 6, 2014

(87) PCT Pub. No.: WO2014/010061
PCT Pub. Date: Jan. 16, 2014

(65) Prior Publication Data
US 2015/0155816 A1 Jun. 4, 2015

(51) Int. Cl.
*H02P 1/00* (2006.01)
*H02P 27/06* (2006.01)
(Continued)

(52) U.S. Cl.
CPC .............. *H02P 27/06* (2013.01); *B60L 11/12* (2013.01); *H02M 1/08* (2013.01); *H02P 5/74* (2013.01);
(Continued)

(58) Field of Classification Search
CPC ....... H02P 29/028; H02P 5/74; B62D 5/046; B62D 5/0487; B60K 1/02
See application file for complete search history.

(56) References Cited

U.S. PATENT DOCUMENTS 7,742,268 B2  6/2010  Shige
8,605,471 B2  12/2013  Ogura et al.
(Continued)

FOREIGN PATENT DOCUMENTS

JP  2000-23369 A  1/2000
JP  2005-341731 A  12/2005
(Continued)

OTHER PUBLICATIONS

An Office Action; Notice of Reasons for Rejection, issued by the Japanese Patent Office on Dec. 7, 2015, which corresponds to Japanese Patent Application No. 2014-524553 and is related to U.S. Appl. No. 14/399,363; with English language partial translation.
(Continued)

*Primary Examiner* — Karen Masih
(74) *Attorney, Agent, or Firm* — Studebaker & Brackett PC

(57) ABSTRACT

An object of the present invention is to achieve reductions in size and costs of a vehicle-mounted motor driving control board in a configuration which allows the redundancy of a power supply to be ensured. The vehicle-mounted motor driving control board is formed by one printed circuit board on which are formed two inverter driving circuits for driving two inverter circuits for three-phase motors, and a voltage step-up/step-down driving circuit for driving a voltage step-up/step-down circuit for supplying electric power to the inverter circuits. The vehicle-mounted motor driving control board further includes a first power supply circuit for supplying electric power to part of constituent circuits constituting the voltage step-up/step-down driving circuit and the two inverter driving circuits, and a second power supply circuit for supplying electric power to the remainder of the constituent circuits in the voltage step-up/step-down driving circuit and the two inverter driving circuits.

5 Claims, 9 Drawing Sheets

(51) Int. Cl.
*B60L 11/12* (2006.01)
*H02P 5/74* (2006.01)
*H02M 1/08* (2006.01)
*H02M 3/335* (2006.01)
*H02M 1/00* (2006.01)
*H02M 1/32* (2007.01)

(52) U.S. Cl.
CPC ... *H02M 3/3353* (2013.01); *H02M 2001/0006* (2013.01); *H02M 2001/007* (2013.01); *H02M 2001/008* (2013.01); *H02M 2001/325* (2013.01); *Y02T 10/648* (2013.01); *Y02T 10/7077* (2013.01)

(56) References Cited

U.S. PATENT DOCUMENTS

| 2007/0227788 | A1 | 10/2007 | Shige | |
| 2011/0204839 | A1* | 8/2011 | Mukai | B62D 5/0487 318/724 |

FOREIGN PATENT DOCUMENTS

| JP | 2008-236994 A | 10/2008 |
| JP | 2008-283766 A | 11/2008 |
| JP | 2010-273479 A | 12/2010 |
| JP | 2011-259517 A | 12/2011 |
| JP | 2012-5229 A | 1/2012 |

OTHER PUBLICATIONS

International Search Report; PCT/JP2012/067833; Oct. 16, 2012.
An Office Action; Notice of Reasons for Rejection, issued by the Japanese Patent Office on Jun. 23, 2015, which corresponds to Japanese Patent Application No. 2014-524553 and is related to U.S. Appl. No. 14/399,363; with English language partial translation.
Notification Concerning Transmittal of International Preliminary Report on Patentability and Translation of Written Opinion of the International Searching Authority; PCT/JP2012/067833; issued on Jan. 22, 2015.
An Office Action issued by the Korean Patent Office on Apr. 27, 2016, which corresponds to Korean Patent Application No. 10-2015-7000085 and is related to U.S. Appl. No. 14/399,363; with English language partial translation.

* cited by examiner

F I G . 1
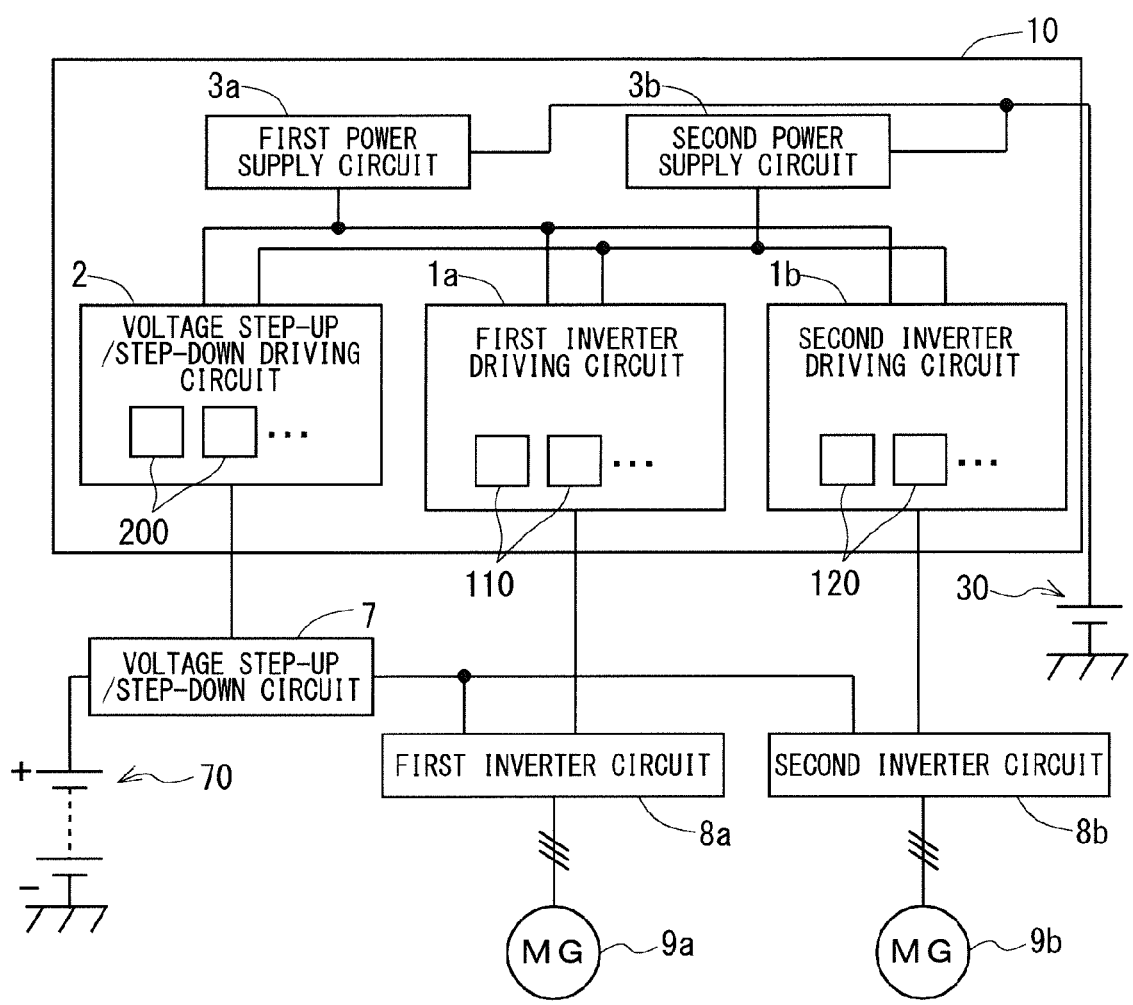

F I G . 3
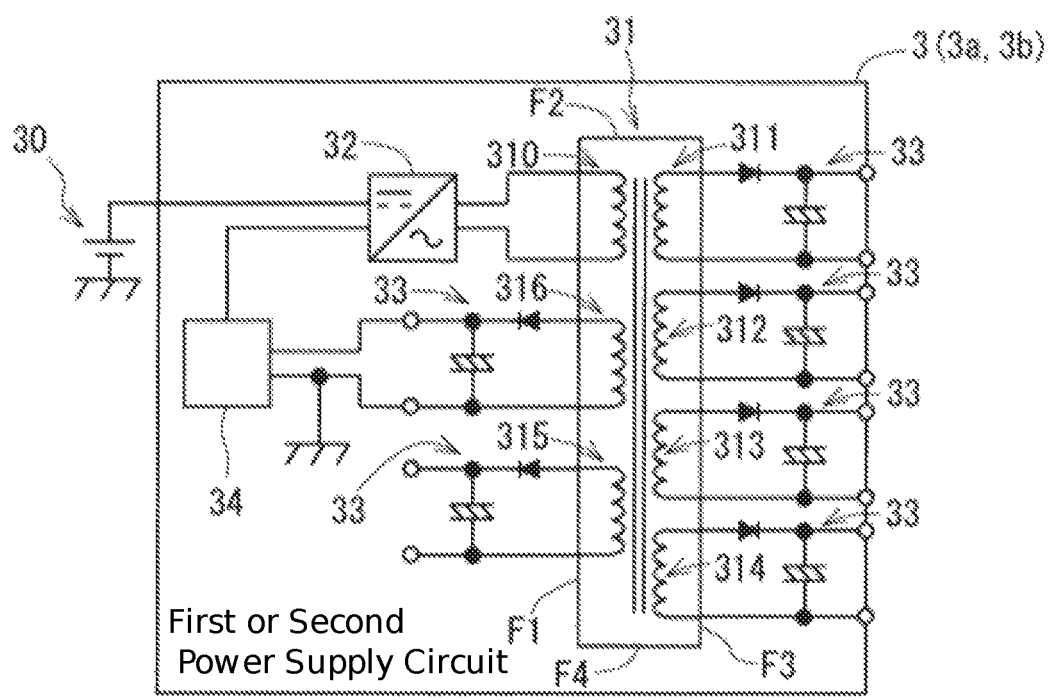

F I G . 1 1
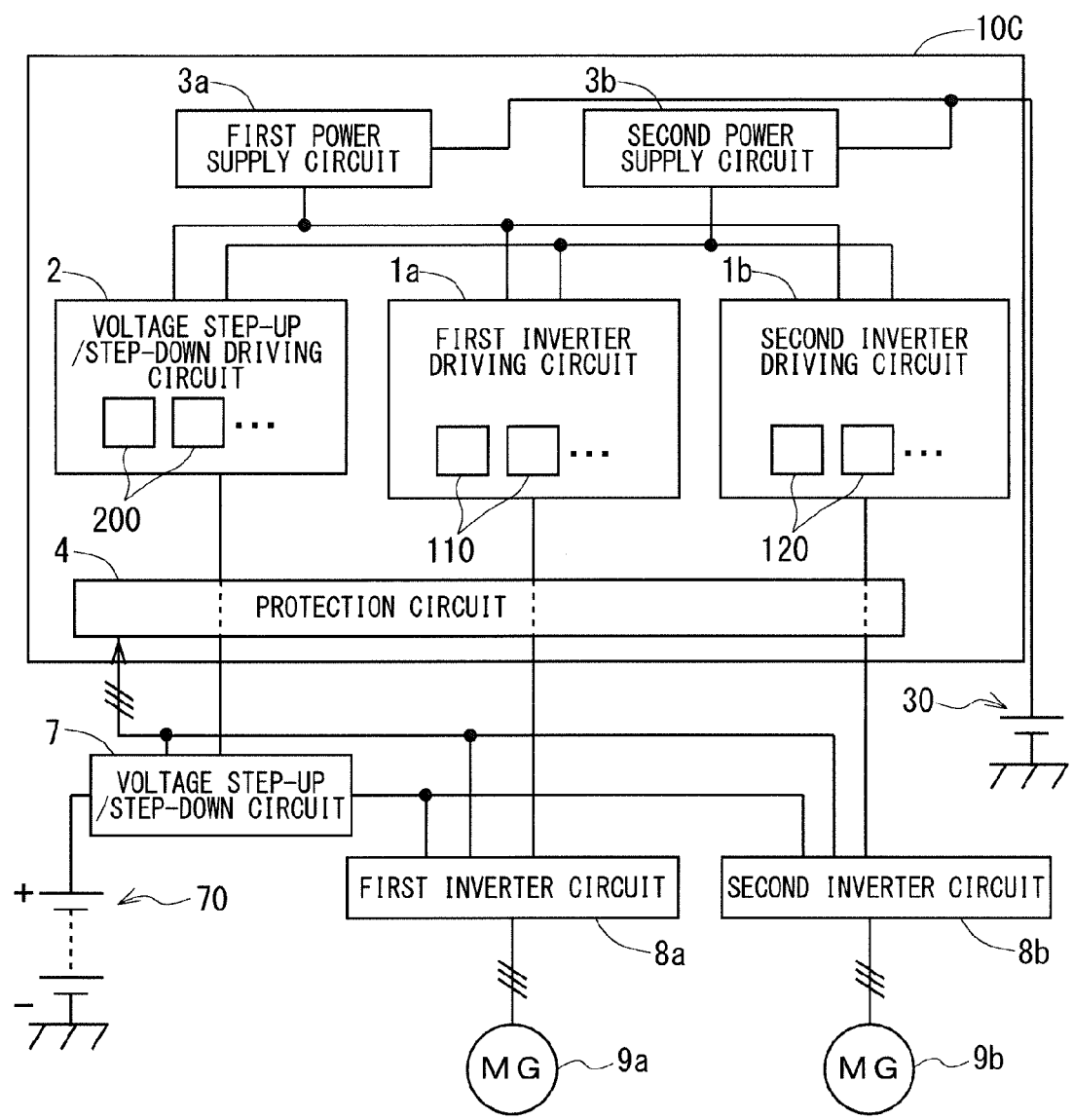

VEHICLE-MOUNTED MOTOR DRIVING CONTROL BOARD

TECHNICAL FIELD

The present invention relates to a vehicle-mounted motor driving control board on which is formed a circuit for driving two inverter circuits connected respectively to two three-phase motors mounted on a vehicle and a voltage step-up/step-down circuit for supplying electric power to the inverter circuits.

BACKGROUND ART

As presented in Patent Document 1, two three-phase motors, two inverter circuits connected respectively to the three-phase motors, and a voltage step-up/step-down circuit for supplying electric power to the inverter circuits are mounted in a conventional hybrid automobile. The voltage step-up/step-down circuit is formed by a chopper circuit, and performs a voltage step-up conversion and a voltage step-down conversion on an input voltage supplied from a high-voltage battery to thereby generate a P-phase potential and an N-phase potential which are necessary for the inverter circuits. For example, one of the two three-phase motors is a motor for driving wheels, and the other is a motor for electric power regeneration.

A control board on which is formed a circuit for driving the two inverter circuits and the voltage step-up/step-down circuit is further mounted in the conventional hybrid automobile. The control board is referred to hereinafter as a vehicle-mounted motor driving control board. This vehicle-mounted motor driving control board is comprised of a single printed circuit board, and is connected to a semiconductor module including two inverter circuits and a voltage step-up/step-down circuit.

The vehicle-mounted motor driving control board includes two inverter circuit driving circuits which are circuits for driving the two inverter circuits, respectively, and a voltage step-up/step-down driving circuit which is a circuit for driving the voltage step-up/step-down circuit.

The vehicle-mounted motor driving control board further includes a power supply circuit for supplying a constant DC voltage to the two inverter circuit driving circuits and to the voltage step-up/step-down driving circuit. This power supply circuit converts an input voltage supplied from a battery into a control voltage (output voltage) necessary for the two inverter circuit driving circuits and the voltage step-up/step-down driving circuit.

PRIOR ART DOCUMENT

Patent Document

Patent Document 1: Japanese Patent Application Laid-Open No. 2008-283766

SUMMARY OF INVENTION

Problems to be Solved by the Invention

In general, a conventional vehicle-mounted motor driving control board includes three power supply circuits corresponding respectively to two inverter circuit driving circuits and a voltage step-up/step-down driving circuit. If a failure of one of the power supply circuits occurs, the vehicle-mounted motor driving control board, which includes the three power supply circuits, is able to continue part of the operations of the two inverter circuits, thereby ensuring the redundancy of the power supply.

However, further reductions in size and costs of the vehicle-mounted motor driving control board have recently been required. In addition, it is important for the vehicle-mounted motor driving control board to ensure the redundancy of the power supply.

It is an object of the present invention to achieve reductions in size and costs of a vehicle-mounted motor driving control board in a configuration which allows the redundancy of a power supply to be ensured.

Means to Solve the Problem

A vehicle-mounted motor driving control board according to one aspect of the present invention is formed by one printed circuit board and includes a circuit formed thereon which drives two inverter circuits connected respectively to two three-phase motors mounted on a vehicle and a voltage step-up/step-down circuit for supplying electric power to the inverter circuits. Further, the vehicle-mounted motor driving control board according to the one aspect of the present invention includes: a voltage step-up/step-down driving circuit, a first inverter driving circuit, a second inverter driving circuit, a first power supply circuit, and a second power supply circuit which will be described below. The aforementioned voltage step-up/step-down driving circuit is a circuit for driving the aforementioned voltage step-up/step-down circuit. The aforementioned first inverter driving circuit is a circuit for driving one of the aforementioned two inverter circuits. The aforementioned second inverter driving circuit is a circuit for driving the other of the aforementioned two inverter circuits. The aforementioned first power supply circuit is a circuit for supplying electric power to part of constituent circuits constituting the aforementioned voltage step-up/step-down driving circuit, the aforementioned first inverter driving circuit and the aforementioned second inverter driving circuit. The aforementioned second power supply circuit is a circuit for supplying electric power to the remainder of the aforementioned constituent circuits constituting the aforementioned voltage step-up/step-down driving circuit, the aforementioned first inverter driving circuit and the aforementioned second inverter driving circuit.

Effects of the Invention

The vehicle-mounted motor driving control board according to the one aspect of the present invention described above achieves the reductions in size and cost in corresponding relation to the omission of one power supply circuit, as compared with a conventional board including three power supply circuits. Further, in the vehicle-mounted motor driving control board, the two power supply circuits share the supply of electric power (DC voltages) to the plurality of constituent circuits constituting the voltage step-up/step-down driving circuit and the two inverter driving circuits. Thus, if a failure of one of the power supply circuits occurs, the vehicle-mounted motor driving control board is capable of implementing the function of continuing the operation of part of the two inverter circuits (the redundancy of the power supply).

BRIEF DESCRIPTION OF DRAWINGS

FIG. 1 is a schematic block diagram of a vehicle-mounted motor driving device including a vehicle-mounted motor driving control board 10 according to a first embodiment of the present invention.

FIG. 3 is a schematic diagram of a DC-DC converter which is an example of a power supply circuit provided in the vehicle-mounted motor driving control board 10.

FIG. 11 is a schematic block diagram of a vehicle-mounted motor driving device including a vehicle-mounted motor driving control board 10C according to a fourth embodiment of the present invention.

DESCRIPTION OF EMBODIMENTS

Description will now be given on embodiments of the present invention with reference to the accompanying drawings. The embodiments to be described below are examples embodying the present invention, and are not cases which limit the technical scope of the present invention.

A vehicle-mounted motor driving control board according to each embodiment to be described below is mounted in an electric vehicle such as a hybrid automobile.

First Embodiment

Schematic Configuration of Vehicle-Mounted Motor Driving Device

Figure 2:
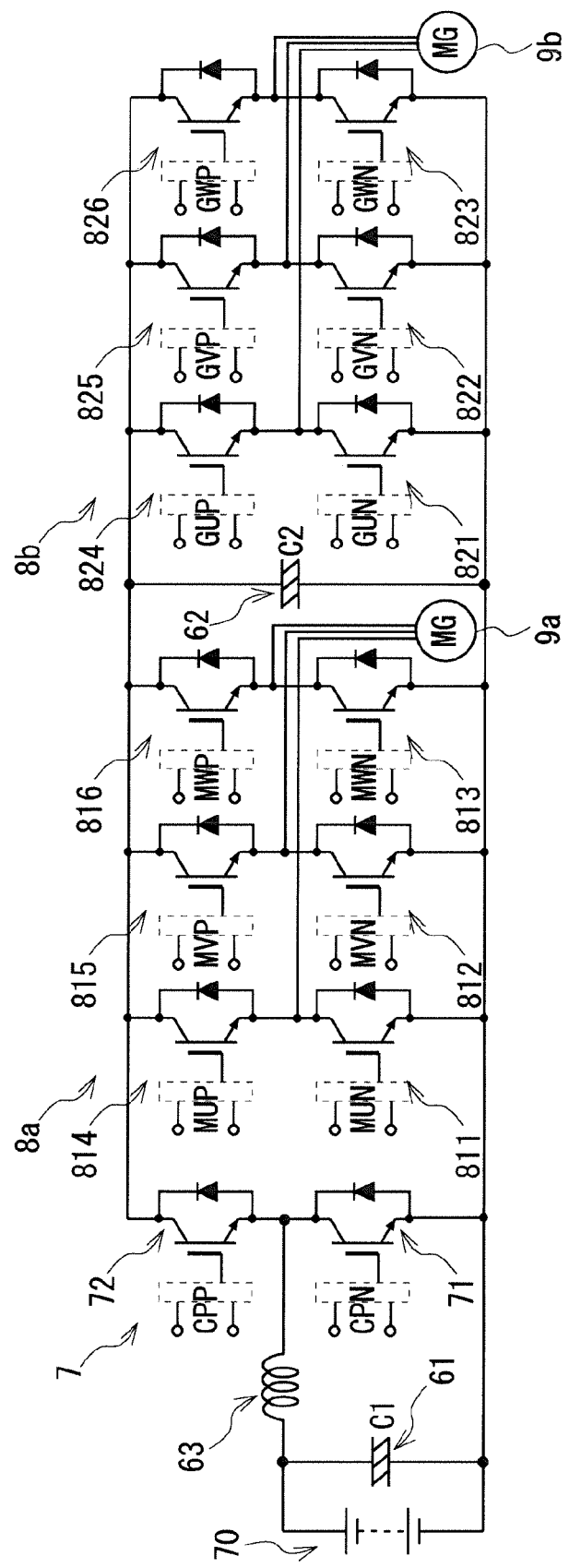
FIG. 2 is a schematic diagram of circuits to be driven by the vehicle-mounted motor driving control board 10.

With reference to FIGS. 1 and 2, the schematic configuration of a vehicle-mounted motor driving control board 10 and a vehicle-mounted motor driving device including the vehicle-mounted motor driving control board 10 according to a first embodiment of the present invention will be described. Two three-phase motors 9a and 9b, two inverter circuits 8a and 8b connected respectively to the two three-phase motors 9a and 9b, and a voltage step-up/step-down circuit 7 for supplying electric power to the two inverter circuits 8a and 8b are also mounted in a vehicle in which the vehicle-mounted motor driving control board 10 is mounted.

In the present embodiment, a first three-phase motor 9a which is one of the two three-phase motors 9a and 9b is a motor for driving wheels. A second three-phase motor 9b which is the other of the two three-phase motors 9a and 9b is a motor for electric power regeneration which regenerates electric power by means of a rotatably driving force transmitted from wheels. Thus, the second three-phase motor 9b according to the present embodiment is also a three-phase AC generator.

The two inverter circuits 8a and 8b include a first inverter circuit 8a connected to the first three-phase motor 9a, and a second inverter circuit 8b connected to the second three-phase motor 9b.

FIG. 2 is a schematic diagram of the voltage step-up/step-down circuit 7, the first inverter circuit 8a and the second inverter circuit 8b which are circuits to be driven by the vehicle-mounted motor driving control board 10. In FIG. 2, the reference character CP designates a chopper circuit; P and N designate a P phase and an N phase, respectively, of an output from the voltage step-up/step-down circuit 7; M designates a motor; G designates electric power regeneration (electricity production); and U, V and W designate a U phase, a V phase and a W phase, respectively, of a three-phase alternating current.

The voltage step-up/step-down circuit 7 is formed by chopper circuits, and performs a voltage step-up conversion and a voltage step-down conversion on an input voltage supplied from a high-voltage battery 70 to thereby generate a P-phase potential and an N-phase potential which are necessary for the first inverter circuit 8a and the second inverter circuit 8b. To this end, the voltage step-up/step-down circuit 7 includes an N-phase power switching circuit 71 which steps down the input voltage to generate the N-phase potential, and a P-phase power switching circuit 72 which steps up the input voltage to generate the P-phase potential. An output voltage from the high-voltage battery 70 is, for example, not less than 100 V.

Each of the N-phase power switching circuit 71 and the P-phase power switching circuit 72 includes an IGBT (Insulated gate bipolar transistor), and a FWD (Free Wheeling Diode) connected in inverse-parallel with the IGBT. The N-phase power switching circuit 71 and the P-phase power switching circuit 72 are connected in series with each other to form a half-bridge. The FWD is a diode for commutating a load current.

A connection point of the N-phase power switching circuit 71 and the P-phase power switching circuit 72 is connected through a choke coil 63 to a positive electrode end of the high-voltage battery 70. A first capacitor 61 for storing high-voltage electricity therein is connected in parallel with the high-voltage battery 70 with respect to a voltage supply line from the high-voltage battery 70 to the voltage step-up/step-down circuit 7.

A low-potential terminal of the N-phase power switching circuit 71 is a N-phase output end of the voltage step-up/step-down circuit 7, and is connected to a low-potential DC power supply line of the first inverter circuit 8a and the second inverter circuit 8b. On the other hand, a high-potential terminal of the P-phase power switching circuit 72 is a P-phase output end of the voltage step-up/step-down circuit 7, and is connected to a high-potential DC power supply line of the first inverter circuit 8a and the second inverter circuit 8b.

The voltage step-up/step-down circuit 7 outputs a DC voltage stepped up intermittently at a predetermined frequency in accordance with a driving signal from a voltage step-up/step-down driving circuit 2. It should be noted that the configuration and operation of the voltage step-up/step-down circuit 7 formed by chopper circuits are well known.

The first inverter circuit 8a includes power switching circuits 811 to 813 for the respective three phases on the N-phase side (lower arm side), and power switching circuits 814 to 816 for the respective three phases on the P-phase side (upper arm side). The U-phase power switching circuit 811 on the N-phase side and the U-phase power switching circuit 814 on the P-phase side constitute a circuit identical with the voltage step-up/step-down circuit 7. The V-phase power switching circuit 812 on the N-phase side and the V-phase power switching circuit 815 on the P-phase side also constitute a circuit identical with the voltage step-up/step-down circuit 7. Further, the W-phase power switching circuit 813 on the N-phase side and the W-phase power switching circuit 816 on the P-phase side also constitute a circuit identical with the voltage step-up/step-down circuit 7.

The first inverter circuit 8a outputs three-phase AC voltages (U-phase voltage, V-phase voltage and W-phase voltage) which are out of phase with each other by 120 degrees in accordance with a driving signal from a first inverter driving circuit 1a.

On the other hand, the second inverter circuit 8b forms a circuit identical with the first inverter circuit 8a. Specifically, the second inverter circuit 8b includes a U-phase power switching circuit 821 on the N-phase side, a U-phase power switching circuit 824 on the P-phase side, a V-phase power switching circuit 822 on the N-phase side, a V-phase power switching circuit 825 on the P-phase side, a W-phase power switching circuit 823 on the N-phase side, and a W-phase power switching circuit 826 on the P-phase side.

The second inverter circuit 8b, however, converts three-phase AC voltages supplied from the second three-phase motor 9b into a DC voltage in accordance with a driving signal from a second inverter driving circuit 1b to store the DC voltage in a second capacitor 62. The second capacitor 62 is connected in parallel with the second inverter circuit 8b with respect to a voltage supply line from the voltage step-up/step-down circuit 7. It should be noted that the configuration and operation of the first inverter circuit 8a and the second inverter circuit 8b which are three-phase inverter circuits are well known.

Configuration of Vehicle-Mounted Motor Driving Control Board

Next, the configuration of the vehicle-mounted motor driving control board 10 will be described with reference to FIG. 1 and FIGS. 3 and 4.

The vehicle-mounted motor driving control board 10 is formed by a single printed circuit board, and is a board on which circuits for driving the first inverter circuit 8a, the second inverter circuit 8b and the voltage step-up/step-down circuit 7 are formed.

As shown in FIG. 1, the vehicle-mounted motor driving control board 10 includes the voltage step-up/step-down driving circuit 2, the first inverter driving circuit 1a, the second inverter driving circuit 1b, a first power supply circuit 3a, and a second power supply circuit 3b.

Voltage Step-Up/Step-Down Driving Circuit

The voltage step-up/step-down driving circuit 2 is a circuit for driving the voltage step-up/step-down circuit 7. As shown in FIG. 4, the voltage step-up/step-down driving circuit 2 includes an N-phase voltage step-up/step-down driving circuit 201 for outputting a driving signal to the N-phase power switching circuit 71 of the voltage step-up/step-down circuit 7, and a P-phase voltage step-up/step-down driving circuit 202 for outputting a driving signal to the P-phase power switching circuit 72 of the voltage step-up/step-down circuit 7.

The N-phase voltage step-up/step-down driving circuit 201 outputs a gate voltage (driving signal) to between the gate and emitter of the IGBT of the N-phase power switching circuit 71. Likewise, the P-phase voltage step-up/step-down driving circuit 202 outputs a gate voltage (driving signal) to between the gate and emitter of the IGBT of the P-phase power switching circuit 72. The N-phase voltage step-up/step-down driving circuit 201 and the P-phase voltage step-up/step-down driving circuit 202 are examples of constituent circuits 200 of the voltage step-up/step-down driving circuit 2.

Inverter Driving Circuits

The first inverter driving circuit 1a is a circuit for driving the first inverter circuit 8a. As shown in FIG. 4, the first inverter driving circuit 1a includes a first N-phase inverter driving circuit 111, and a first P-phase inverter driving circuit 112. The first N-phase inverter driving circuit 111 is a circuit for outputting a driving signal to the power switching circuits 811 to 813 for the respective three phases on the N-phase side (lower arm side) in the first inverter circuit 8a. The first P-phase inverter driving circuit 112, on the other hand, is a circuit for outputting a driving signal to the power switching circuits 814 to 816 for the respective three phases on the P-phase side (upper arm side) in the first inverter circuit 8a. The first N-phase inverter driving circuit 111 and the first P-phase inverter driving circuit 112 are examples of constituent circuits 110 of the first inverter driving circuit 1a.

The second inverter driving circuit 1b, on the other hand, is a circuit for driving the second inverter circuit 8b. As shown in FIG. 4, like the first inverter driving circuit 1a, the second inverter driving circuit 1b includes a second N-phase inverter driving circuit 121, and a second P-phase inverter driving circuit 122. The second N-phase inverter driving circuit 121 is a circuit for outputting a driving signal to the power switching circuits 821 to 823 for the respective three phases on the N-phase side in the second inverter circuit 8b. The second P-phase inverter driving circuit 122, on the other hand, is a circuit for outputting a driving signal to the power switching circuits 824 to 826 for the respective three phases on the P-phase side in the second inverter circuit 8b. The driving signals are gate voltage signals of the IGBTs provided in the two inverter circuits 8a and 8b. The second N-phase inverter driving circuit 121 and the second P-phase inverter driving circuit 122 are examples of constituent circuits 120 of the second inverter driving circuit 1b.

Power Supply Circuits

The first power supply circuit 3a is a circuit for supplying DC power to some of the plurality of constituent circuits 200, 110 and 120 constituting the voltage step-up/step-down driving circuit 2, the first inverter driving circuit 1a and the second inverter driving circuit 1b. Likewise, the second power supply circuit 3b is a circuit for supplying electric power to the remainder of the plurality of constituent circuits 200, 110 and 120 constituting the voltage step-up/step-down driving circuit 2, the first inverter driving circuit 1a and the second inverter driving circuit 1b.

That is, the first power supply circuit 3a and the second power supply circuit 3b share the supply of DC control voltages to the plurality of constituent circuits 200, 110 and 120 constituting the voltage step-up/step-down driving circuit 2 and the two inverter driving circuits 1a and 1b.

FIG. 3 is a schematic diagram of a DC-DC converter 3 which is an example of the first power supply circuit 3a and the second power supply circuit 3b. The DC-DC converter 3 includes a power transformer 31, an inverter circuit 32, rectifier circuits 33, and an output voltage stabilizing circuit 34.

The power transformer 31 includes one primary coil 310 and a plurality of secondary coils 311 to 316. In the following description, the four outer edge portions of the power transformer 31 are as follows. An outer edge portion of the power transformer 31 where the primary coil 310 is disposed is referred to as a first outer edge portion F1; an outer edge portion thereof adjacent to the first outer edge portion F1 is referred to as a second outer edge portion F2; an outer edge portion thereof on the opposite side from the first outer edge portion F1 is referred to as a third outer edge portion F3; and an outer edge portion thereof on the opposite side from the second outer edge portion F2 is referred to as a fourth outer edge portion F4.

More specifically, the power transformer 31 includes the primary coil 310 and the secondary coils 316 and 315 which are arranged along the first outer edge portion F1, and the secondary coils 311 to 314 which are arranged along the third outer edge portion F3.

In the example shown in FIG. 3, the power transformer 31 includes the primary coil 310, a sixth secondary coil 316 and a fifth secondary coil 315 which are arranged in order from the second outer edge portion F2 side along the first outer edge portion F1. The power transformer 31 shown in FIG. 3 further includes a first secondary coil 311, a second secondary coil 312, a third secondary coil 313 and a fourth secondary coil 314 which are arranged in order from the second outer edge portion F2 side along the third outer edge portion F3. That is, the power transformer 31 in the example shown in FIG. 3 includes the one primary coil 310 and the six secondary coils 311 to 316.

Of the six secondary coils 311 to 316, the sixth secondary coil 316 disposed adjacent to the primary coil 310 is connected through one of the rectifier circuits 33 to the output voltage stabilizing circuit 34. Each of the remaining five secondary coils, i.e. the first secondary coil 311 to the fifth secondary coil 315, is connected through one of the rectifier circuits 33 to any one of the plurality of constituent circuits 200, 110 and 120 constituting the voltage step-up/step-down driving circuit 2, the first inverter driving circuit 1a and the second inverter driving circuit 1b which are formed on the vehicle-mounted motor driving control board 10.

The inverter circuit 32 converts a DC input voltage inputted from a low-voltage battery 30 into an AC voltage to supply the AC voltage to the primary coil 310. It should be noted that the low-voltage battery 30 is a battery for outputting a relatively low voltage of 12 V or 24 V, for example.

The rectifier circuits 33 are connected to the plurality of secondary coils 311 to 316, and convert an AC voltage generated in each of the secondary coils 311 to 316 into a DC voltage. Accordingly, the DC-DC converter 3 shown in FIG. 3 includes the six rectifier circuits 33. Output ends of the five rectifier circuits 33 connected respectively to the five secondary coils, i.e. the first secondary coil 311 to the fifth secondary coil 315, are ends for outputting the control voltage.

The use of the DC-DC converter 3 shown in FIG. 3 as the first power supply circuit 3a and the second power supply circuit 3b achieves the power supply circuits capable of supplying electric power with stability.

By enhancing the insulating properties of the secondary coils connected to the constituent circuits 200 of the voltage step-up/step-down driving circuit 2 among the secondary coils of the DC-DC converter 3, the reliability of the power supply circuits is improved.

The output voltage stabilizing circuit 34 performs feedback control on the inverter circuit 32 in accordance with a difference between an output voltage and a target voltage of the sixth secondary coil 316 to cause the output voltages from the respective secondary coils 311 to 316 to be fixed at the target voltage. The feedback control is, for example, PWM (Pulse Width Modulation) control of the control signal to be outputted to a MOS transistor not shown provided in the inverter circuit 32.

Figure 4:
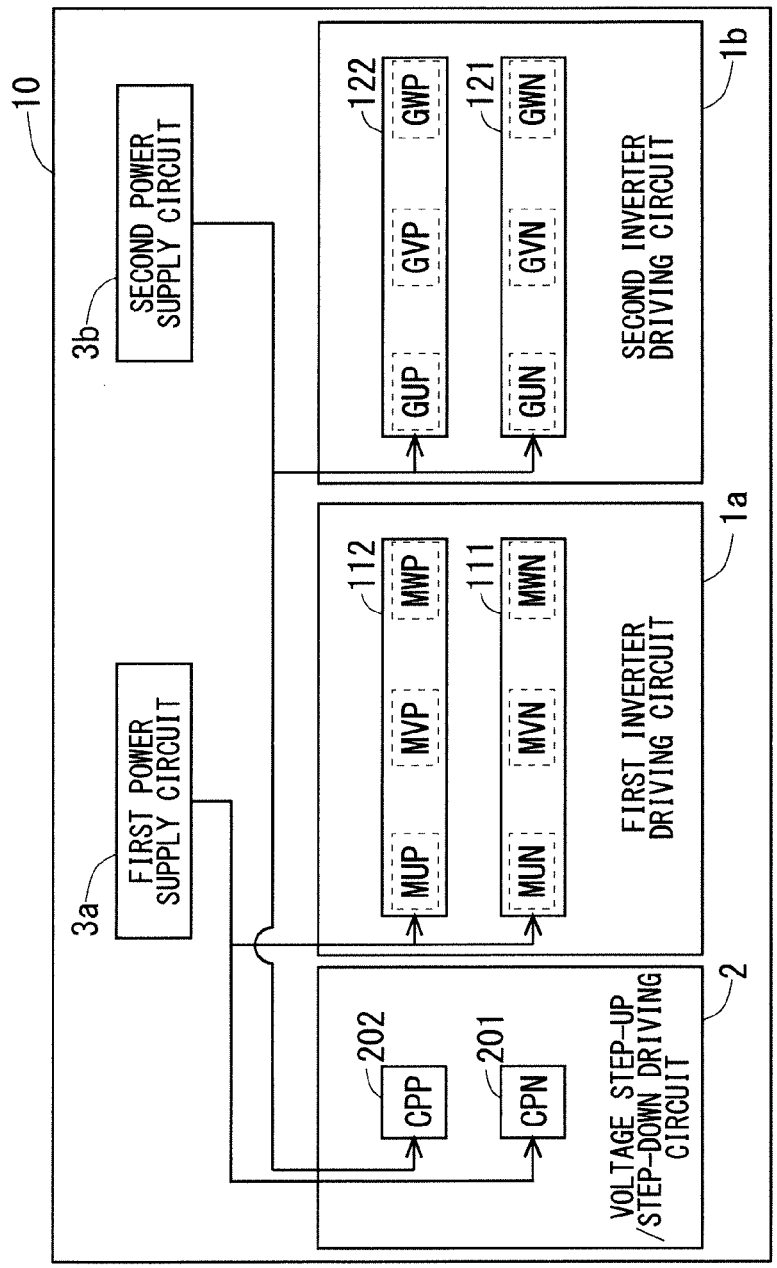
FIG. 4 is a diagram showing a supply system for control voltages in the vehicle-mounted motor driving control board 10.

FIG. 4 is a diagram showing a supply system for the control voltages in the vehicle-mounted motor driving control board 10. When the DC-DC converter 3 shown in FIG. 3 is employed as the first power supply circuit 3a and the second power supply circuit 3b, it is contemplated that the first power supply circuit 3a and the second power supply circuit 3b supply the control voltages to the voltage step-up/step-down driving circuit 2, the first inverter driving circuit 1a and the second inverter driving circuit 1b in accordance with the system shown in FIG. 4.

In the example shown in FIG. 4, the first power supply circuit 3a supplies electric power (control voltage) to the N-phase voltage step-up/step-down driving circuit 201 which is part of the voltage step-up/step-down driving circuit 2 and to the first N-phase inverter driving circuit 111 and the first P-phase inverter driving circuit 112 which are all constituent circuits 110 constituting the first inverter driving circuit. The second power supply circuit 3b supplies electric power (control voltage) to the remaining circuits, i.e. to the P-phase voltage step-up/step-down driving circuit 202 which is part of the voltage step-up/step-down driving circuit 2 and to the second N-phase inverter driving circuit 121 and the second P-phase inverter driving circuit 122 which are all constituent circuits 120 constituting the second inverter driving circuit 1b.

From the viewpoint of the fact that the decrease in the number of types of components achieves the further reduction in costs, it is desirable that the first power supply circuit 3a and the second power supply circuit 3b are circuits identical in specs with each other. The circuits identical in specs with each other mean that the circuits are identical in components constituting the circuits and in structure for connecting the components with each other.

Redundancy of Power Supply

When the first power supply circuit 3a and the second power supply circuit 3b supply the control voltages in accordance with the system shown in FIG. 4, the operation of part of the two inverter circuits 8a and 8b can be continued to ensure the redundancy of the power supply if a failure of one of the first power supply circuit 3a and the second power supply circuit 3b occurs.

Figure 5:
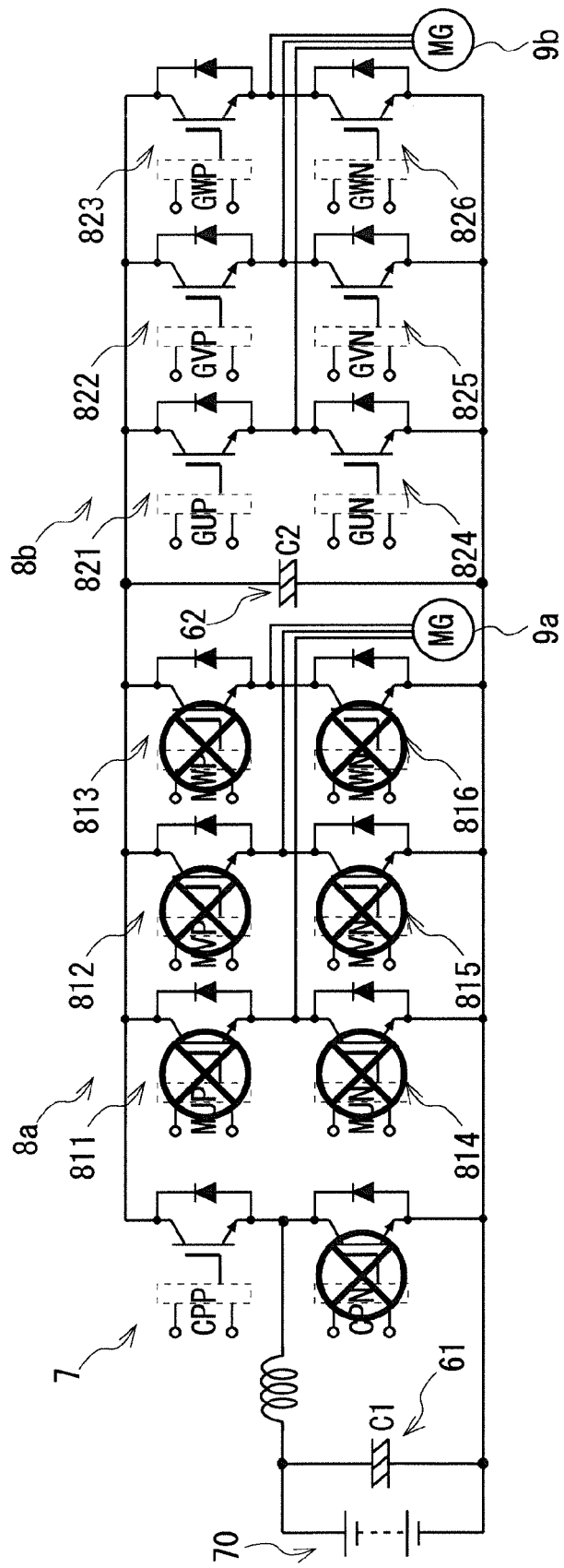
FIG. 5 is a diagram schematically showing an operating state of the circuits to be driven when a failure of one of the two power supply circuits provided in the vehicle-mounted motor driving control board 10 occurs.

FIG. 5 is a diagram schematically showing an operating state of circuits to be driven when a failure of the first power supply circuit 3a occurs. In FIG. 5, circuits marked with crosses are circuits the operation of which is stopped by the failure of the first power supply circuit 3a.

When the failure of the first power supply circuit 3a occurs, the N-phase voltage step-up/step-down driving circuit 201 of the voltage step-up/step-down driving circuit 2 and the first inverter driving circuit 1a are in an operation-stopped state. Thus, the operation of the IGBTs is stopped in the N-phase power switching circuit 71 of the voltage step-up/step-down circuit 7 and in the entire first inverter circuit 8a.

On the other hand, the P-phase voltage step-up/step-down driving circuit 202 of the voltage step-up/step-down circuit 2 and the second inverter circuit 8b for electric power regeneration operate normally, and the FWD on the N-phase side in the voltage step-up/step-down driving circuit 7 operates normally. Thus, these circuits operating normally and the choke coil 63 (inductance) constitute a voltage step-down chopper circuit which in turn steps down the voltage of the second capacitor 62 and charges the first capacitor 61.

As described above, when the failure of the first power supply circuit 3a occurs but the second power supply circuit 3b is normal, the second inverter circuit 8b for electric power regeneration is able to continue the operation of storing electricity in the first capacitor 61. Further, the aforementioned voltage step-down chopper circuit steps down the voltage of the bus to produces the effect of preventing an excessive increase in the voltage of the bus from damaging the device.

Likewise, when a failure of the second power supply circuit 3b occurs but the first power supply circuit 3a is normal, the N-phase voltage step-up/step-down driving circuit 201 of the voltage step-up/step-down driving circuit 2 and the first inverter circuit 8a operate normally, and the FWD on the P-phase side in the voltage step-up/step-down circuit 7 operates normally. Thus, these circuits operating normally and the choke coil 63 constitute a voltage step-up chopper circuit which in turn steps up the voltage of the second capacitor 62. Thus, the first inverter circuit 8a operates normally because of the supply of electric power from the second capacitor 62 and the control signal from the first inverter driving circuit 1a to be able to drive the first three-phase motor 9a.

As described above, when the failure of the second power supply circuit 3b occurs but the first power supply circuit 3a is normal, the first inverter circuit 8a is able to continue to drive the first three-phase motor 9a.

Circuit Layout

Figure 6:
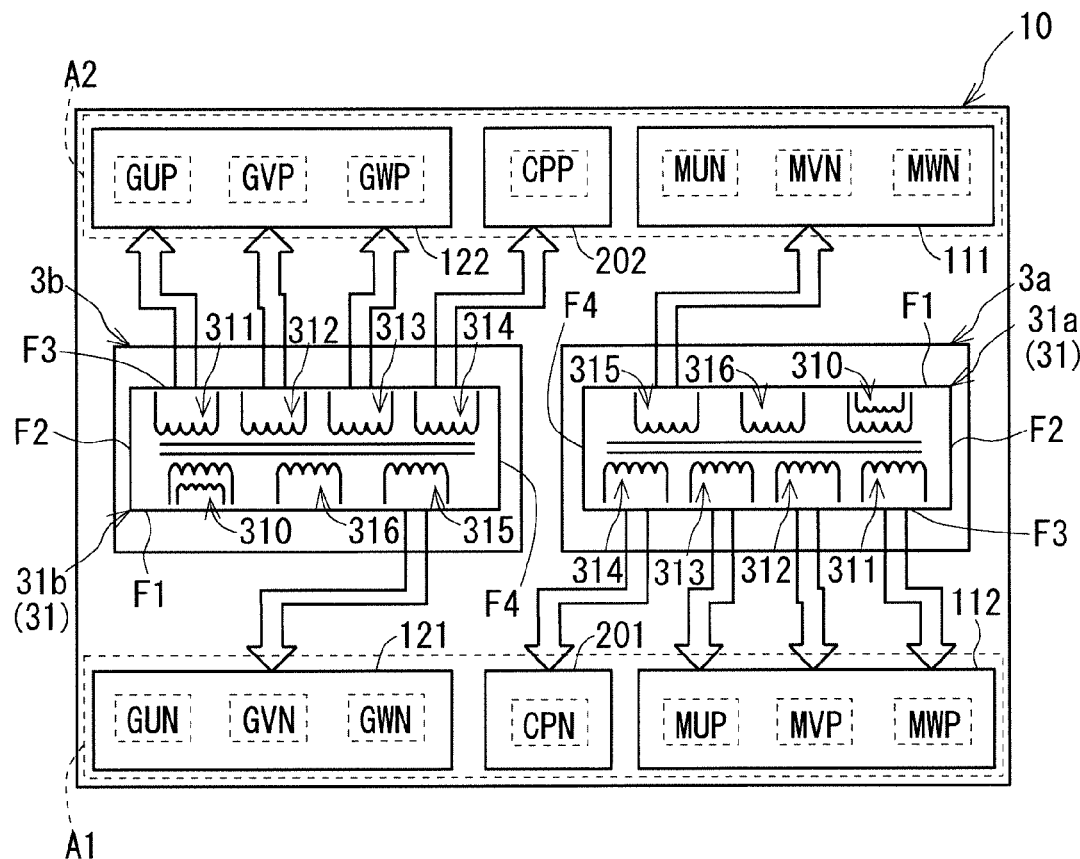
FIG. 6 is a diagram showing a schematic circuit layout and a supply system for control voltages in the vehicle-mounted motor driving control board 10.
Figure 7:
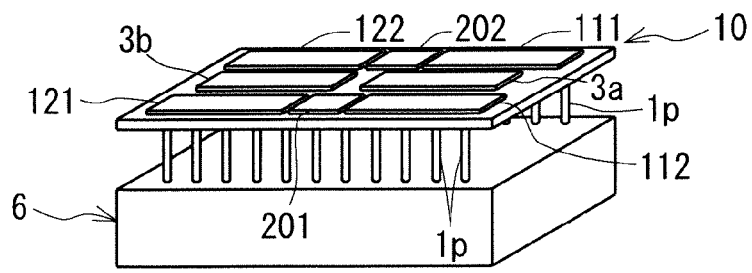
FIG. 7 is a schematic perspective view of the vehicle-mounted motor driving control board 10 and a semiconductor module connected thereto.

Next, a circuit layout in the vehicle-mounted motor driving control board 10 will be described with reference to FIGS. 6 and 7. FIG. 6 is a diagram showing a schematic circuit layout and a supply system for control voltages in the vehicle-mounted motor driving control board 10. FIG. 7 is a schematic perspective view of the vehicle-mounted motor driving control board 10 and a semiconductor module 6 connected thereto.

The vehicle-mounted motor driving control board 10 shown in FIG. 6 includes the first power supply circuit 3a and the second power supply circuit 3b which are formed by the DC-DC converter 3 shown in FIG. 3, and the two power supply circuits 3a and 3b supply the control voltages in accordance with the system shown in FIG. 4. In the following description, the power transformer 31 of the first power supply circuit 3a is referred to as a first power transformer 31a, and the power transformer 31 of the second power supply circuit 3b is referred to as a second power transformer 31b.

As shown in FIG. 6, the first power transformer 31a and the second power transformer 31b in the vehicle-mounted motor driving control board 10 are arranged so that the fourth outer edge portions F4 in the first power transformer 31a and the second power transformer 31b are in opposed relation to each other.

Also, a constituent circuit 110 which constitutes part of the first inverter driving circuit 1a, a constituent circuit 200 which constitutes part of the voltage step-up/step-down driving circuit 2, and a constituent circuit 120 which constitutes part of the second inverter driving circuit 1b are arranged in order from the second outer edge portion F2 side of the first power transformer 31a in a first region A1 on the side where the third outer edge portion F3 of the first power transformer 31a and the first outer edge portion F1 of the second power transformer 31b are positioned.

More specifically, the first P-phase inverter driving circuit 112, the N-phase voltage step-up/step-down driving circuit 201 and the second N-phase inverter driving circuit 121 are arranged in the first region A1 in order from the second outer edge portion F2 side of the first power transformer 31a.

Each of the constituent circuits arranged in the first region A1 is connected to any of the following: the secondary coils 311 to 314 arranged on the third outer edge portion F3 side in the first power transformer 31a and the secondary coil 315 arranged on the first outer edge portion F1 side in the second power transformer 31b.

More specifically, the first P-phase inverter driving circuit 112 is connected to the first secondary coil 311, the second secondary coil 312 and the third secondary coil 313 in the first power transformer 31a. The N-phase voltage step-up/step-down driving circuit 201 is connected to the fourth secondary coil 314 in the first power transformer 31a. The second N-phase inverter driving circuit 121 is connected to the fifth secondary coil 315 in the second power transformer 31b.

Also, a constituent circuit 110 which constitutes the remainder of the first inverter driving circuit 1a, a constituent circuit 200 which constitutes the remainder of the voltage step-up/step-down driving circuit 2, and a constituent circuit 120 which constitutes the remainder of the second inverter driving circuit 1b are arranged in order from the second outer edge portion F2 side of the first power transformer 31a in a second region A2 on the side where the first outer edge portion F1 in the first power transformer 31a and the third outer edge portion F3 in the second power transformer 31b are positioned.

More specifically, the first N-phase inverter driving circuit 111, the P-phase voltage step-up/step-down driving circuit 202 and the second P-phase inverter driving circuit 122 are arranged in the second region A2 in order from the second outer edge portion F2 side of the first power transformer 31a.

Each of the constituent circuits arranged in the second region A2 is connected to any of the following: the secondary coil 315 arranged on the first outer edge portion F1 side in the first power transformer 31a and the secondary coils 311 to 314 arranged on the third outer edge portion F3 side in the second power transformer 31b.

More specifically, the first N-phase inverter driving circuit 111 is connected to the fifth secondary coil 315 in the first power transformer 31a. The P-phase voltage step-up/step-down driving circuit 202 is connected to the fourth secondary coil 314 in the second power transformer 31b. The second P-phase inverter driving circuit 122 is connected to the third secondary coil 313, the second secondary coil 312 and the first secondary coil 311 in the second power transformer 31b.

Although the constituent circuits are connected through the rectifier circuits 33 shown in FIG. 3 to the secondary coils, circuits other than the power transformers 31 constituting the two power supply circuit 3a and 3b are not shown in FIG. 6.

The use of the circuit layout shown in FIG. 6 achieves very short electric power supply lines between the first and second power transformers 31a and 31b, and the two inverter driving circuits 1a, 1b and the voltage step-up/step-down driving circuit 2.

As shown in FIG. 7, the vehicle-mounted motor driving control board 10 is provided with a plurality of connection terminals 1p connected to the semiconductor module 6 including the voltage step-up/step-down circuit 7 and the two inverter circuits 8a and 8b. These connection terminals 1p establish electrical connections between the two inverter driving circuits 1a, 1b and the voltage step-up/step-down driving circuit 2 in the vehicle-mounted motor driving control board 10, and the two inverter circuits 8a, 8b and the voltage step-up/step-down circuit 7 in the semiconductor module 6 to transmit the driving signals.

The vehicle-mounted motor driving control board 10 shown in FIG. 6 is provided with the connection terminals 1p arranged in a line on the back side of the first region A1 and the connection terminals 1p arranged in a line on the back side of the second region A2. Specifically, the connection terminals 1p for supplying the driving signals to the voltage step-up/step-down circuit 7 and to the two inverter circuits 8a and 8b in the vehicle-mounted motor driving control board 10 are provided on the back side of the circuits which generate the corresponding driving signals. The circuit layout shown in FIG. 6 is suitable for the arrangement of the connection terminals 1p in two lines in the vehicle-mounted motor driving control board 10.

Effects

The vehicle-mounted motor driving control board 10 described above achieves the reductions in size and cost in corresponding relation to the omission of one power supply circuit, as compared with a conventional board including three power supply circuits. Further, in the vehicle-mounted motor driving control board 10, the two power supply circuits 3a and 3b share the supply of electric power (DC voltages) to the plurality of constituent circuits 200, 110 and 120 constituting the voltage step-up/step-down driving circuit and the two inverter driving circuits. Thus, if a failure of one of the power supply circuits occurs, the vehicle-mounted motor driving control board 10 is capable of implementing the function of continuing the operation of part of the two inverter circuits (the redundancy of the power supply).

For example, as shown in FIG. 4, the first power supply circuit 3a supplies electric power to the N-phase voltage step-up/step-down driving circuit 201 and all constituent circuits 110 of the first inverter driving circuit 1a, and the second power supply circuit 3b supplies electric power to the P-phase voltage step-up/step-down driving circuit 202 and all constituent circuits 120 of the second inverter driving circuit 1b. This allows part of the functions such as the function of storing electricity in the first capacitor 61 by means of the second inverter circuit 8b for electric power regeneration to be continued if a failure of one of the first power supply circuit 3a and the second power supply circuit 3b occurs.

When the position and connection destination of the N-phase voltage step-up/step-down driving circuit 202 and the position and connection destination of the P-phase voltage step-up/step-down driving circuit 201 are interchanged in the configurations shown in FIGS. 4 and 6, effects similar to those obtained by the configurations shown in FIGS. 4 and 6 are produced. In this case, the P-phase voltage step-up/step-down driving circuit 202 receives the supply of electric power (control voltage) from the fourth secondary coil 314 of the first power transformer 31a in the first power supply circuit 3a, and the N-phase voltage step-up/step-down driving circuit 201 receives the supply of electric power from the fourth secondary coil 314 of the second power transformer 31b in the second power supply circuit 3b.

Further, when the first power supply circuit 3a and the second power supply circuit 3b are circuits identical in specs with each other in the vehicle-mounted motor driving control board 10, the further reduction in cost is achieved.

When the connection terminals 1p are arranged in two lines in the vehicle-mounted motor driving control board 10 and the circuit layout shown in FIG. 6 is employed, the path of supply of electric power from the two power supply circuits 3a and 3b to the driving circuits is shortened. This achieves more stable supply of electric power. Further, the path of supply of the driving signals from the driving circuits to the voltage step-up/step-down circuit 7 and the two inverter circuits 8a and 8b is shortened. This achieves more stable supply of the driving signals.

Second Embodiment

Figure 8:
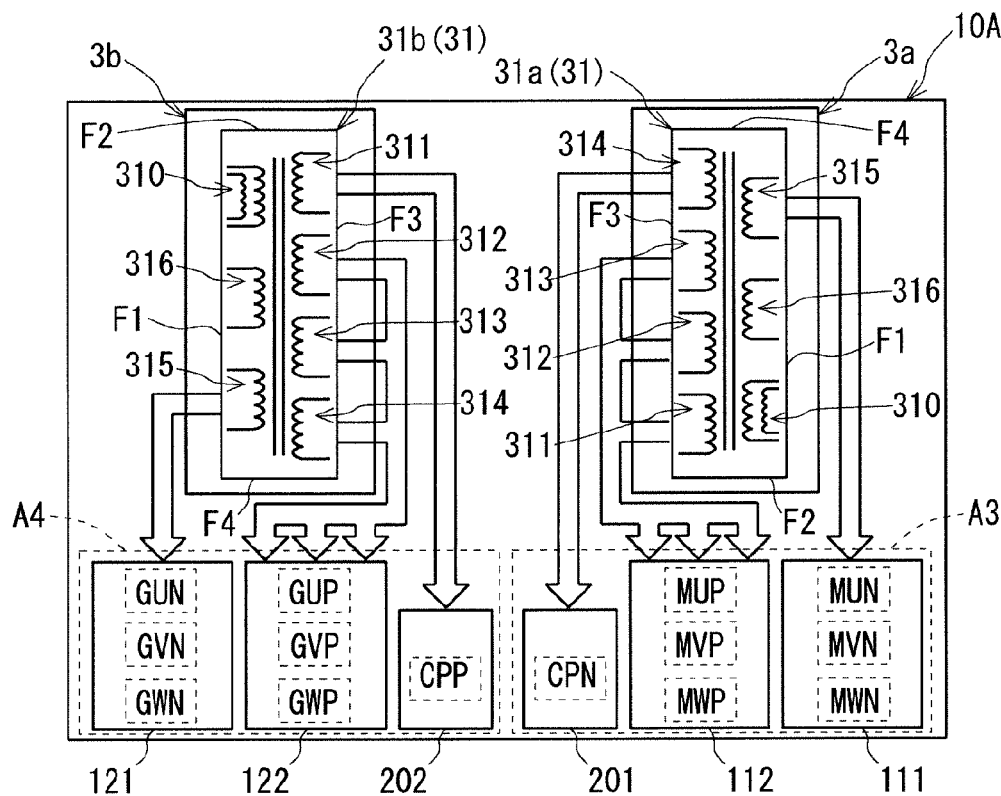
FIG. 8 is a diagram showing a schematic circuit layout and a supply system for control voltages in a vehicle-mounted motor driving control board 10A according to a second embodiment of the present invention.
Figure 9:
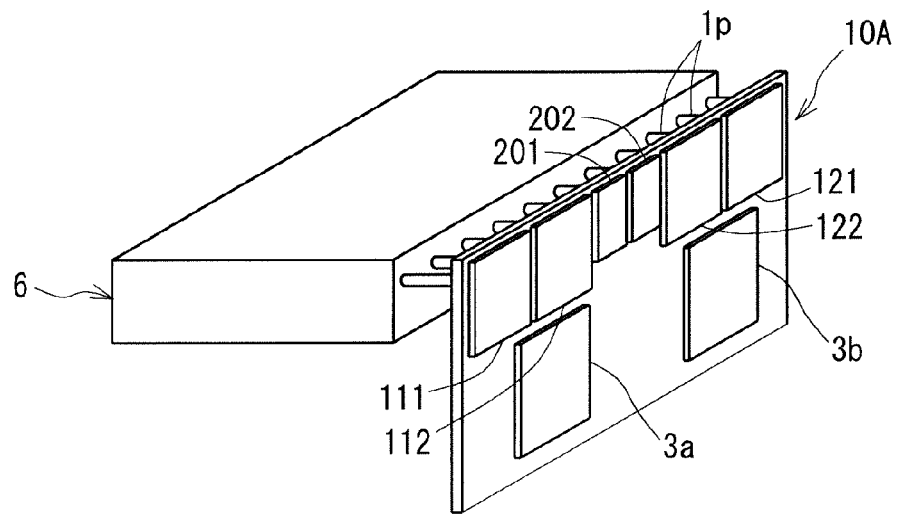
FIG. 9 is a schematic perspective view of the vehicle-mounted motor driving control board 10A and a semiconductor module connected thereto.

Next, a vehicle-mounted motor driving control board 10A according to a second embodiment of the present invention will be described with reference to FIGS. 8 and 9. FIG. 8 is a diagram showing a schematic circuit layout and a supply system for control voltages in the vehicle-mounted motor driving control board 10A. FIG. 9 is a schematic perspective view of the vehicle-mounted motor driving control board 10A and the semiconductor module 6 connected thereto.

The vehicle-mounted motor driving control board 10A differs only in circuit layout from the vehicle-mounted motor driving control board 10 shown in FIGS. 1 to 7. Like reference numerals and characters are used to designate components in FIGS. 8 and 9 identical with those shown in FIGS. 1 to 7. Only differences in the vehicle-mounted motor driving control board 10A from the vehicle-mounted motor driving control board 10 will be described below.

The vehicle-mounted motor driving control board 10A includes the first power supply circuit 3a and the second power supply circuit 3b which are formed by the DC-DC converter 3 shown in FIG. 3, and these two power supply circuits 3a and 3b supply the control voltages in accordance with the system shown in FIG. 4.

As shown in FIG. 8, the first power transformer 31a and the second power transformer 31b in the vehicle-mounted motor driving control board 10A are arranged so that the third outer edge portions F3 in the first power transformer 31a and the second power transformer 31b are in opposed relation to each other.

Also, a constituent circuit 110 which constitutes part of the first inverter driving circuit 1a, a constituent circuit 110 which constitutes the remainder of the first inverter driving circuit 1a, and a constituent circuit 200 which constitutes part of the voltage step-up/step-down driving circuit 2 are arranged in order from the first outer edge portion F1 side of the first power transformer 31a in a first region A3 including a region opposed to the second outer edge portion F2 of the first power transformer 31a.

More specifically, the first N-phase inverter driving circuit 111, the first P-phase inverter driving circuit 112 and the N-phase voltage step-up/step-down driving circuit 201 are arranged in the first region A3 in order from the first outer edge portion F1 side of the first power transformer 31*a*.

Each of the constituent circuits arranged in the first region A3 is connected to any of the following: the secondary coils 311 to 315 in the first power transformer 31*a*.

More specifically, the first N-phase inverter driving circuit 111 is connected to the fifth secondary coil 315 in the first power transformer 31*a*. The first P-phase inverter driving circuit 112 is connected to the first secondary coil 311, the second secondary coil 312 and the third secondary coil 313 in the first power transformer 31*a*. The N-phase voltage step-up/step-down driving circuit 201 is connected to the fourth secondary coil 314 in the first power transformer 31*a*.

Also, a constituent circuit 120 which constitutes part of the second inverter driving circuit 1*b*, a constituent circuit 120 which constitutes the remainder of the second inverter driving circuit 1*b*, and a constituent circuit 200 which constitutes the remainder of the voltage step-up/step-down driving circuit 2 are arranged in order from the first outer edge portion F1 side of the second power transformer 31*b* in a second region A4 including a region opposed to the fourth outer edge portion F4 in the second power transformer 31*b*. As shown in FIG. 8, the second region A4 is a region adjacent to the first region A3.

More specifically, the second N-phase inverter driving circuit 121, the second P-phase inverter driving circuit 122 and the P-phase voltage step-up/step-down driving circuit 202 are arranged in the second region A4 in order from the first outer edge portion F1 side of the second power transformer 31*b*.

Each of the constituent circuits arranged in the second region A4 is connected to any of the following: the secondary coils 311 to 315 in the second power transformer 31*b*.

More specifically, the second N-phase inverter driving circuit 121 is connected to the fifth secondary coil 315 in the second power transformer 31*b*. The second P-phase inverter driving circuit 122 is connected to the second secondary coil 312, the third secondary coil 313 and the fourth secondary coil 314 in the second power transformer 31*b*. The P-phase voltage step-up/step-down driving circuit 202 is connected to the first secondary coil 311 in the second power transformer 31*b*.

Although the constituent circuits are connected through the rectifier circuits 33 shown in FIG. 3 to the secondary coils, circuits other than the power transformers 31 constituting the two power supply circuit 3*a* and 3*b* are not shown in FIG. 8.

The use of the circuit layout shown in FIG. 8 achieves short electric power supply lines between the first and second power transformers 31*a* and 31*b*, and the two inverter driving circuits 1*a*, 1*b* and the voltage step-up/step-down driving circuit 2 in such a state that the constituent circuits 110 and 120 of the two inverter driving circuits 1*a* and 1*b* and the constituent circuits 200 of the voltage step-up/step-down driving circuit 2 are arranged in a line.

As shown in FIG. 9, the vehicle-mounted motor driving control board 10A is provided with the plurality of connection terminals 1*p* connected to the semiconductor module 6. These connection terminals 1*p* establish electrical connections between the two inverter driving circuits 1*a*, 1*b* and the voltage step-up/step-down driving circuit 2 in the vehicle-mounted motor driving control board 10A, and the two inverter circuits 8*a* and 8*b* and the voltage step-up/step-down circuit 7 in the semiconductor module 6 to transmit the driving signals.

The vehicle-mounted motor driving control board 10A shown in FIG. 8 is provided with the connection terminals 1*p* arranged in a line on the back side of the first region A3 and the second region A4. Specifically, the connection terminals 1*p* for supplying the driving signals to the voltage step-up/step-down circuit 7 and to the two inverter circuits 8*a* and 8*b* in the vehicle-mounted motor driving control board 10A are provided on the back side of the circuits which generate the corresponding driving signals. The circuit layout shown in FIG. 8 is suitable for the arrangement of the connection terminals 1*p* in a line in the vehicle-mounted motor driving control board 10A.

Effects

When the vehicle-mounted motor driving control board 10A is employed, effects similar to those obtained when the vehicle-mounted motor driving control board 10 is employed are produced.

When the connection terminals 1*p* are arranged in a line in the vehicle-mounted motor driving control board 10A and the circuit layout shown in FIG. 8 is employed, the path of supply of electric power from the two power supply circuits 3*a* and 3*b* to the driving circuits is shortened. This achieves more stable supply of electric power. Further, the path of supply of the driving signals from the driving circuits to the voltage step-up/step-down circuit 7 and the two inverter circuits 8*a* and 8*b* is shortened. This achieves more stable supply of the driving signals.

Third Embodiment

Figure 10:
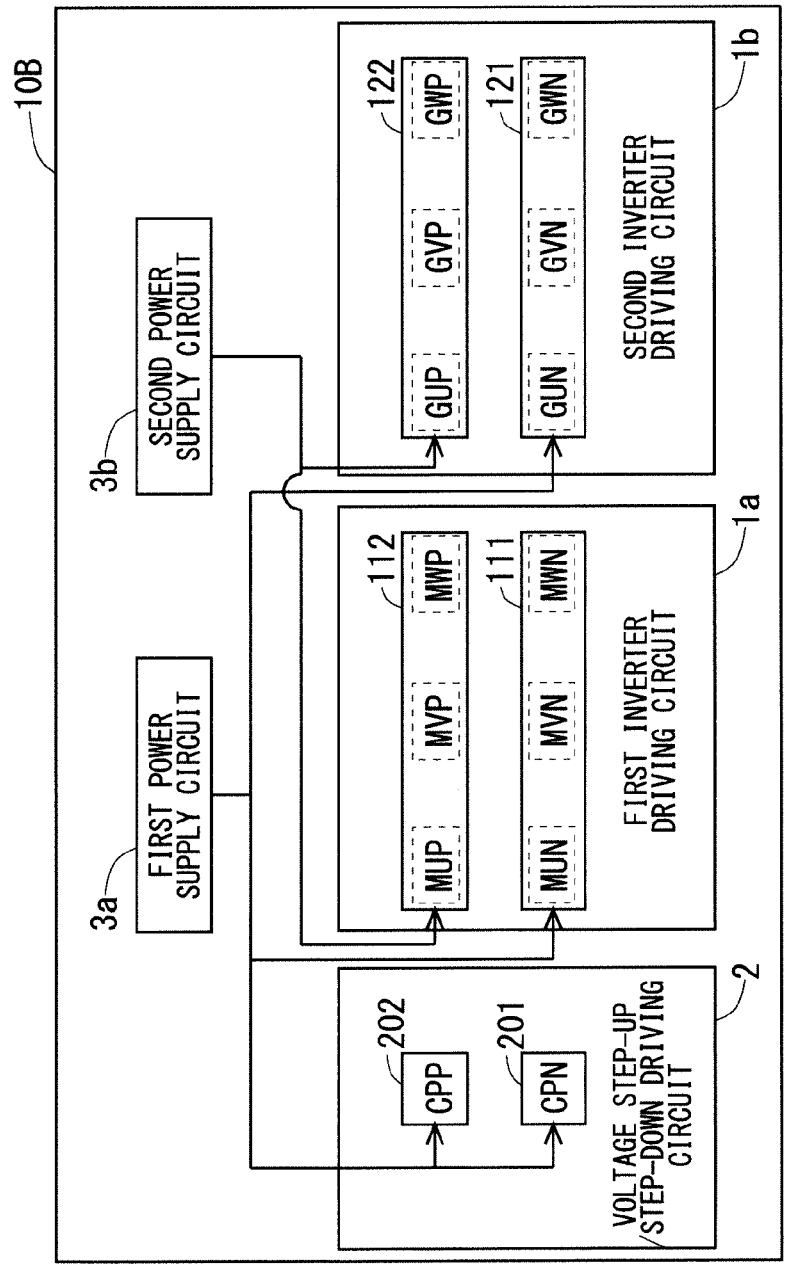
FIG. 10 is a diagram showing a supply system for control voltages in a vehicle-mounted motor driving control board 10B according to a third embodiment of the present invention.

Next, a vehicle-mounted motor driving control board 10B according to a third embodiment of the present invention will be described with reference to FIG. 10. FIG. 10 is a diagram showing a supply system for control voltages in the vehicle-mounted motor driving control board 10B.

The vehicle-mounted motor driving control board 10B differs from the vehicle-mounted motor driving control board 10 shown in FIGS. 1 to 7 in the supply system for electric power (control voltages) from the two power supply circuits 3*a* and 3*b* to the driving circuits. Like reference numerals and characters are used to designate components in FIG. 10 identical with those shown in FIGS. 1 to 7. Only differences in the vehicle-mounted motor driving control board 10B from the vehicle-mounted motor driving control board 10 will be described below.

In the vehicle-mounted motor driving control board 10B, the two power supply circuits 3*a* and 3*b* supply the control voltages to the constituent circuits of the driving circuits in accordance with the system shown in FIG. 10.

As shown in FIG. 10, the first power supply circuit 3*a* in the vehicle-mounted motor driving control board 10B supplies electric power (control voltages) to the N-phase voltage step-up/step-down driving circuit 201 and the P-phase voltage step-up/step-down driving circuit 202 which constitute the voltage step-up/step-down driving circuit 2, to the first N-phase inverter driving circuit 111 which constitutes part of the first inverter driving circuit 1*a*, and to the second N-phase inverter driving circuit 121 which constitutes part of the second inverter driving circuit 1*b*.

The second power supply circuit 3*b* in the vehicle-mounted motor driving control board 10B, on the other hand, supplies electric power (control voltages) to the first P-phase inverter driving circuit 112 which constitutes the remainder of the first inverter driving circuit 1*a*, and to the second P-phase inverter driving circuit 122 which constitutes the remainder of the second inverter driving circuit 1b.

Effects

When the vehicle-mounted motor driving control board 10B is employed, effects of the reductions in size and cost in corresponding relation to the omission of one power supply circuit are produced as in the cases where the vehicle-mounted motor driving control boards 10 and 10A are employed.

Various patterns in addition to those shown in FIGS. 4, 6 and 8 can be contemplated as the pattern of the supply of the control voltages from the two power supply circuits 3a and 3b to the constituent circuits of the driving circuits.

Fourth Embodiment

Next, a vehicle-mounted motor driving control board 10C according to a fourth embodiment of the present invention will be described with reference to FIG. 11. FIG. 11 is a schematic block diagram of a vehicle-mounted motor driving device including the vehicle-mounted motor driving control board 10C.

The vehicle-mounted motor driving control board 10C is configured such that a protection circuit 4 is added, as compared with any one of the vehicle-mounted motor driving control boards 10, 10A and 10B shown in FIGS. 1 to 10. Like reference numerals and characters are used to designate components in FIG. 11 identical with those shown in FIGS. 1 to 10. Only differences in the vehicle-mounted motor driving control board 10C from the vehicle-mounted motor driving control boards 10, 10A and 10B will be described below.

As shown in FIG. 11, the vehicle-mounted motor driving control board 10C further includes the protection circuit 4 in addition to the components provided in the vehicle-mounted motor driving control boards 10, 10A and 10B.

A state signal indicative of the state of each of the voltage step-up/step-down circuit 7 and the two inverter circuits 8a and 8b is inputted from each of the voltage step-up/step-down circuit 7 and the two inverter circuits 8a and 8b to the protection circuit 4. The state signal is, for example, a detection signal of a sensor provided in each circuit. The sensor provided in each circuit includes, for example, one or more of the following: a voltage sensor, a current sensor and a temperature sensor.

When a previously determined abnormal condition based on the state signal obtained from each of the voltage step-up/step-down circuit 7 and the two inverter circuits 8a and 8b is satisfied, the protection circuit 4 changes a driving signal to be outputted to a circuit corresponding to the abnormal condition among the voltage step-up/step-down circuit 7 and the two inverter circuits 8a and 8b to a previously determined fail safe signal (safe side control signal). It is needless to say that the driving signal is a signal outputted from each of the voltage step-up/step-down driving circuit 2 and the inverter driving circuits 1a and 1b to a corresponding one of the voltage step-up/step-down circuit 7 and the two inverter circuits 8a and 8b.

For example, when the state signal obtained from any one of the voltage step-up/step-down circuit 7 and the two inverter circuits 8a and 8b satisfies the previously determined abnormal condition, the protection circuit 4 changes the driving signal to be outputted to the circuit from which the state signal is inputted to the previously determined fail safe signal. That is, when the abnormal condition based on the inputted state signal is satisfied, the protection circuit 4 changes the driving signal to be outputted to a circuit corresponding to the satisfied abnormal condition among the voltage step-up/step-down circuit 7 and the two inverter circuits 8a and 8b to the fail safe signal.

The fail safe signal is a signal for turning off the IGBT of a power switching circuit corresponding to the satisfied abnormal condition. The abnormal condition is a condition for determining that an overvoltage, an overcurrent or an excessively high temperature occurs, for example, based on the state signal.

Effects

When the vehicle-mounted motor driving control board 10C is employed, effects similar to those obtained when the vehicle-mounted motor driving control board 10 is employed are produced.

Further, when the vehicle-mounted motor driving control board 10C is employed, damages to the power switching circuits in the voltage step-up/step-down circuit 7 and the two inverter circuits 8a and 8b are avoided. This improves the reliability of the device.

The embodiments according to the present invention may be freely combined within the scope of the invention or the embodiments may be changed and dispensed with, as appropriate.

The invention claimed is:

1. A vehicle-mounted motor driving control board formed by one printed circuit board and including a circuit formed thereon which drives two inverter circuits connected respectively to two three-phase motors mounted on a vehicle and a voltage step-up/step-down circuit for supplying electric power to the inverter circuits, the vehicle-mounted motor driving control board comprising:
a voltage step-up/step-down driving circuit for driving said voltage step-up/step-down circuit;
a first inverter driving circuit for driving one of said two inverter circuits;
a second inverter driving circuit for driving the other of said two inverter circuits;
a first power supply circuit for supplying electric power to part of constituent circuits constituting said voltage step-up/step-down driving circuit, said first inverter driving circuit and said second inverter driving circuit; and
a second power supply circuit for supplying electric power to the remainder of said constituent circuits constituting said voltage step-up/step-down driving circuit, said first inverter driving circuit and said second inverter driving circuit, wherein:
said voltage step-up/step-down driving circuit includes
an N-phase voltage step-up/step-down driving circuit that is one of said constituent circuits for driving a circuit for generating an N-phase potential in said voltage step-up/step-down circuit, and
a P-phase voltage step-up/step-down driving circuit that is one of said constituent circuits-for driving a circuit for generating a P-phase potential in said voltage step-up/step-down circuit;
said first power supply circuit supplies electric power to one of said N-phase voltage step-up/step-down driving circuit and said P-phase voltage step-up/step-down driving circuit and to all of said constituent circuits constituting said first inverter driving circuit; and
said second power supply circuit supplies electric power to the other of said N-phase voltage step-up/step-down driving circuit and said P-phase voltage step-up/step-down driving circuit and to all of said constituent circuits constituting said second inverter driving circuit.

2. The vehicle-mounted motor driving control board according to claim 1, wherein said first power supply circuit and said second power supply circuit are circuits identical in specs with each other.

3. The vehicle-mounted motor driving control board according to claim 1, wherein:
each of said first power supply circuit and said second power supply circuit includes a power transformer having
a primary coil and a plurality of secondary coils arranged along a first outer edge portion among four outer edge portions in order from a second outer edge portion side adjacent to said first outer edge portion, and
a plurality of secondary coils arranged along a third outer edge portion on the opposite side from said first outer edge portion in order from said second outer edge portion side;
said power transformer of said first power supply circuit and said power transformer of said second power supply circuit are arranged so that fourth outer edge portions on the opposite side from said second outer edge portions in said power transformers are in opposed relation to each other;
said constituent circuit which constitutes part of said first inverter driving circuit, said constituent circuit which constitutes part of said voltage step-up/step-down driving circuit and said constituent circuit which constitutes part of said second inverter driving circuit are arranged in order from said second outer edge portion side of said power transformer of said first power supply circuit in a first region on the side where said third outer edge portion of said power transformer of said first power supply circuit and said first outer edge portion of said power transformer of said second power supply circuit are positioned, and are connected to said secondary coils arranged on said third outer edge portion side in said power transformer of said first power supply circuit and to said secondary coil arranged on said first outer edge portion side in said second power transformer; and
said constituent circuit which constitutes the remainder of said first inverter driving circuit, said constituent circuit which constitutes the remainder of said voltage step-up/step-down driving circuit and said constituent circuit which constitutes the remainder of said second inverter driving circuit are arranged in order from said second outer edge portion side of said power transformer of said first power supply circuit in a second region on the side where said first outer edge portion of said power transformer of said first power supply circuit and said third outer edge portion of said power transformer of said second power supply circuit are positioned, and are connected to said secondary coil arranged on said first outer edge portion side in said power transformer of said first power supply circuit and to said secondary coils arranged on said third outer edge portion side in said second power transformer.

4. The vehicle-mounted motor driving control board according to claim 1, wherein:
each of said first power supply circuit and said second power supply circuit includes a power transformer having
a primary coil and a plurality of secondary coils arranged along a first outer edge portion among four outer edge portions in order from a second outer edge portion side adjacent to said first outer edge portion, and
a plurality of secondary coils arranged along a third outer edge portion on the opposite side from said first outer edge in order from said second outer edge portion side;
said power transformer of said first power supply circuit and said power transformer of said second power supply circuit are arranged so that said third outer edge portions in said power transformers are in opposed relation to each other;
said constituent circuit which constitutes part of said first inverter driving circuit, said constituent circuit which constitutes the remainder of said first inverter driving circuit and said constituent circuit which constitutes part of said voltage step-up/step-down driving circuit are arranged in order from said first outer edge portion side of said power transformer of said first power supply circuit in a first region including a region opposed to said second outer edge portion of said power transformer of said first power supply circuit, and are connected to said secondary coils in said power transformer of said first power supply circuit; and
said constituent circuit which constitutes part of said second inverter driving circuit, said constituent circuit which constitutes the remainder of said second inverter driving circuit and said constituent circuit which constitutes the remainder of said voltage step-up/step-down driving circuit are arranged in order from said first outer edge portion side of said power transformer of said second power supply circuit in a second region including a region opposed to a fourth outer edge portion on the opposite side from said second outer edge portion of said power transformer of said second power supply circuit and adjacent to said first region, and are connected to said secondary coils in said power transformer (31b) of said second power supply circuit.

5. The vehicle-mounted motor driving control board according to claim 1, further comprising
a protection circuit receiving a state signal indicative of the state of each of said voltage step-up/step-down circuit and said two inverter circuits from each of said voltage step-up/step-down circuit and said two inverter circuits, and changing a driving signal to be outputted to a circuit corresponding to a previously determined abnormal condition among said voltage step-up/step-down circuit and said two inverter circuits to a previously determined safe side control signal when said abnormal condition based on the state signal is satisfied.

* * * * *